(12) United States Patent
Laslo

(10) Patent No.: US 10,627,969 B2
(45) Date of Patent: Apr. 21, 2020

(54) TOUCH SENSOR PATTERN WITH FLOATING PADS

(71) Applicant: Microsoft Technology Licensing, LLC, Redmond, WA (US)

(72) Inventor: Ori Laslo, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 15/918,970

(22) Filed: Mar. 12, 2018

(65) Prior Publication Data

US 2019/0278397 A1    Sep. 12, 2019

(51) Int. Cl.
*G06F 3/044* (2006.01)
*G06F 3/045* (2006.01)
*G06F 3/041* (2006.01)

(52) U.S. Cl.
CPC .............. *G06F 3/044* (2013.01); *G06F 3/045* (2013.01); *G06F 3/0418* (2013.01); *G06F 2203/04111* (2013.01); *G06F 2203/04112* (2013.01)

(58) Field of Classification Search
CPC ........ G06F 3/044; G06F 3/0418; G06F 3/045; G06F 2203/04112
See application file for complete search history.

(56) References Cited

U.S. PATENT DOCUMENTS

| | | | |
|---|---|---|---|
| 8,681,120 B2 | 3/2014 | Kanehira et al. | |
| 8,947,366 B2 | 2/2015 | Chien et al. | |
| 9,151,790 B1 | 10/2015 | Hoshtanar | |
| 9,563,318 B2 | 2/2017 | Hoshtanar et al. | |
| 9,639,228 B2 | 5/2017 | Barton et al. | |
| 2010/0201633 A1 | 8/2010 | Mozdzyn et al. | |
| 2011/0090154 A1* | 4/2011 | Kuo | G06F 3/044 345/173 |
| 2013/0194213 A1 | 8/2013 | Chou et al. | |

(Continued)

FOREIGN PATENT DOCUMENTS

| | | |
|---|---|---|
| EP | 2881843 A2 | 6/2015 |
| WO | 2015102349 A1 | 7/2015 |

OTHER PUBLICATIONS

Barrett, et al., "Projected-Capacitive Touch Technology", In Journal of Information Display, vol. 26, Issue 3, Mar. 2010, 9 Pages.

(Continued)

*Primary Examiner* — Amare Mengistu
*Assistant Examiner* — Jennifer L Zubajlo

(57) ABSTRACT

In various examples there is an apparatus for sensing a touch event. The apparatus has a plurality of transmit electrodes arranged to carry a signal, each of the transmit electrodes comprising a transmit body section and a transmit bridge section. The apparatus has a plurality of receive electrodes arranged to receive the signal via electrostatic coupling with the transmit electrodes, each of the receive electrodes comprising a receive body section and a receive bridge section. Individual ones of the transmit and receive bridge sections are arranged to cross such that a gap is formed between the transmit and receive bridge sections. One or more regions of floating conductive material are positioned in proximity to the transmit and receive body sections, each region comprising one or more members of conductive material extending into the gaps.

20 Claims, 13 Drawing Sheets

(56) References Cited

U.S. PATENT DOCUMENTS

| 2015/0077383 A1 | 3/2015 | Kang et al. |
| 2016/0202789 A1 | 7/2016 | Kim et al. |
| 2017/0147133 A1 | 5/2017 | Choi |
| 2018/0032177 A1 | 2/2018 | Choi et al. |

OTHER PUBLICATIONS

"International Search Report and Written Opinion Issued in PCT Application No. PCT/US2019/020462", dated Apr. 17, 2019, 14 Pages.

* cited by examiner

TOUCH SENSOR PATTERN WITH FLOATING PADS

BACKGROUND

In recent years, touchscreens have seen widespread growth as the preferred method of input for a number of electronic products and devices. Most consumer smartphones and tablet personal computers (PCs), for example, now all utilize touchscreen technology enabling novel methods of interaction between user and device. The most common types of touchscreen technology include resistive and capacitive systems; however, other less common systems also utilize infrared, surface acoustic wave, and near-field imaging techniques. Accuracy and responsiveness are ongoing considerations in the development of touchscreens.

The embodiments described below are not limited to implementations that solve any or all of the disadvantages of known touchscreen technology.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an apparatus for sensing a touch event. The apparatus has a plurality of transmit electrodes arranged to carry a signal, each of the transmit electrodes comprising a transmit body section and a transmit bridge section. The apparatus has a plurality of receive electrodes arranged to receive the signal via electrostatic coupling with the transmit electrodes, each of the receive electrodes comprising a receive body section and a receive bridge section. Individual ones of the transmit and receive bridge sections are arranged to cross such that a gap is formed between the transmit and receive bridge sections. One or more regions of floating conductive material are positioned in proximity to the transmit and receive body sections, each region comprising one or more members of conductive material extending into the gaps.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Electronic devices such as tablet computers, smart phones, smart watches, and others often incorporate a touchscreen or touch panel to display information and receive one or more user inputs made by touching the display. Touch panels area also used as track pads on laptop computers and other devices.

Figure 1:
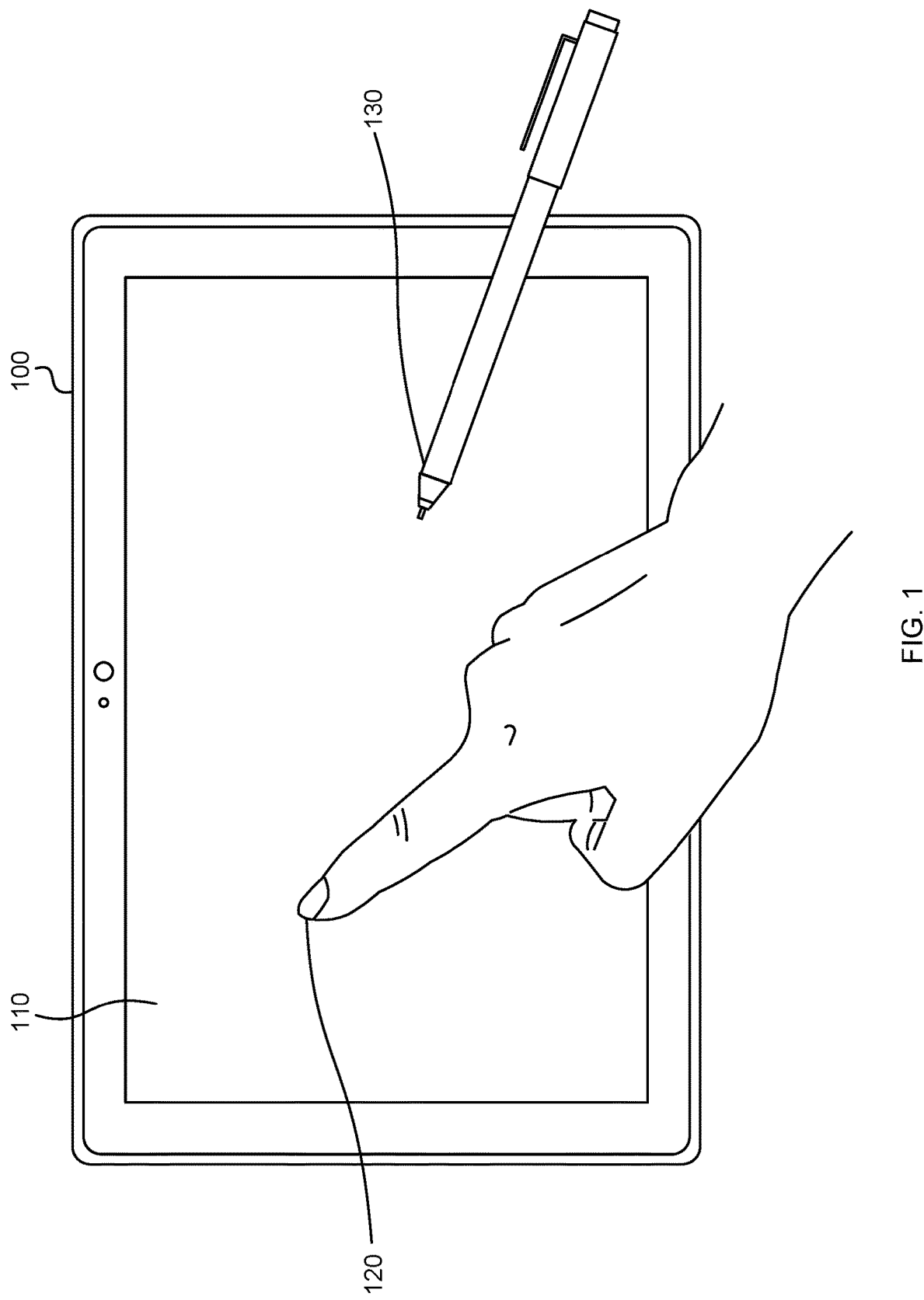
FIG. 1 illustrates a computing device comprising a touchscreen.

FIG. 1 shows an example of a tablet device 100 incorporating a touchscreen 110. Multiple technologies are available for producing a touchscreen, however typically a touchscreen comprises a mutual capacitance touch sensor with a capacitive sensing medium incorporating a plurality of intersecting row and column electrodes, commonly referred to as transmit and receive electrodes. Mutual capacitance is a capacitance that occurs between two charge-holding objects or conductors, in which a current passing through one conductor passes over into the other conductor. A drive signal voltage thus may be applied on the transmit electrodes and a mutual capacitance is created at each electrode intersection where the transmit and receive electrodes cross. When the touchscreen 110 is approached by an electrical conductor such as a human finger 120 or conductive stylus 130, the electromagnetic field at each intersection is disturbed and thus the mutual capacitance is altered. This change in capacitance may be registered to a location on the touchscreen 110 in order to determine a location of a touch event. In assigning the location of the touch event, coordinates of the touch event are computed from the measured change of capacitance and interpolation is used to compute coordinates of user input positions within individual cells of the grid rather than at intersections of the grid.

Accuracy and responsiveness are key issues for consideration in the design of a touchscreen. It is advantageous to design a touch sensor circuit that is able to distinguish between touch and non-touch events, i.e. the change in capacitance at each intersection, in a robust and responsive manner. Another issue concerns visibility on a touch screen in the case that the touch panel sensor is incorporated in a touch screen. The design of the touch panel sensor is to be made so that it does not interfere with display of images on the touch display. The electrodes are typically made from transparent material but regions on a substrate carrying the electrodes may be visible through the touch panel display in some cases. The present disclosure aims to address the issues disclosed above and improve the functioning of a touch sensor, or a computing device comprising the touch sensor.

Figure 2:
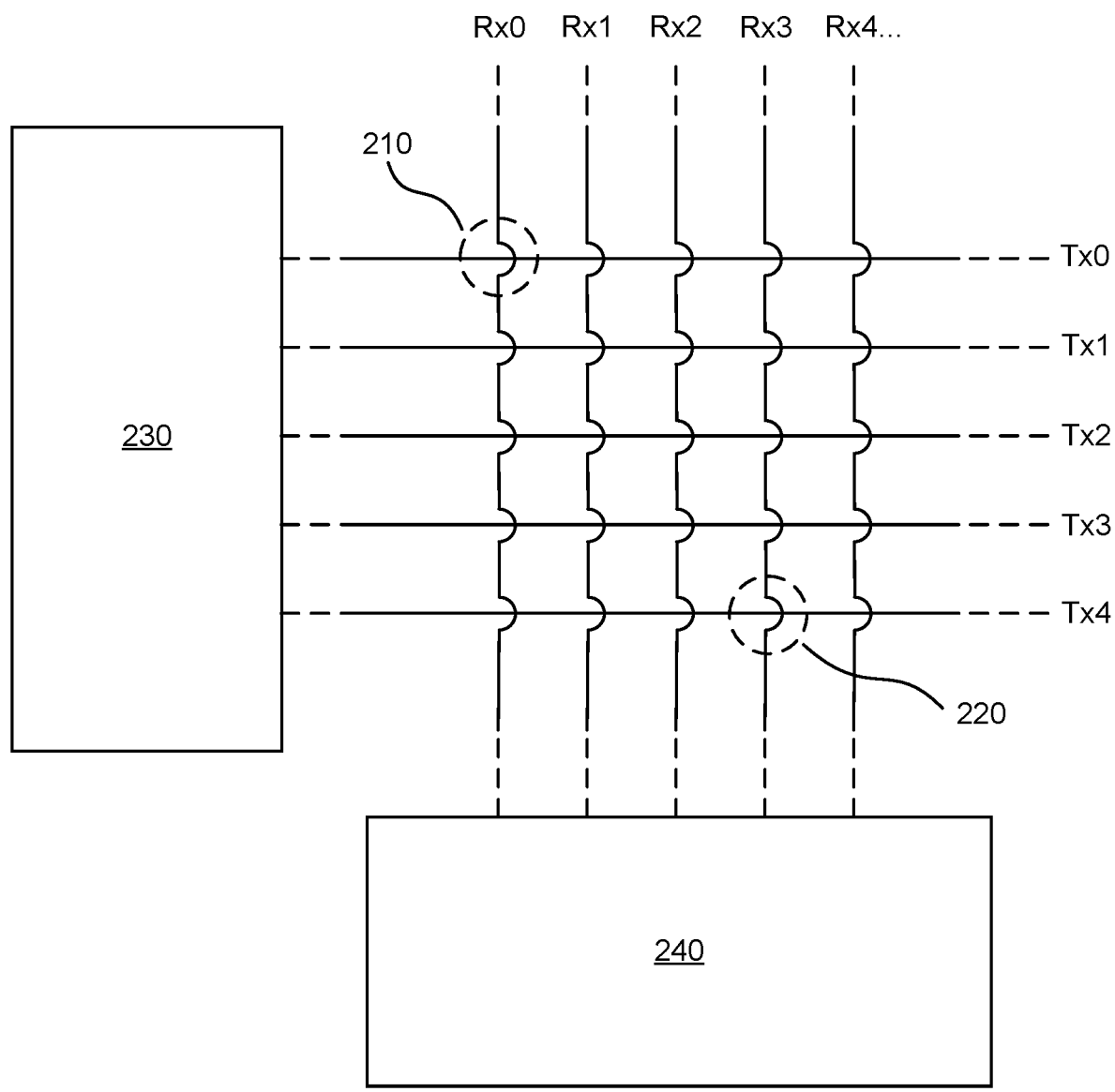
FIG. 2 is a schematic diagram of an electrode arrangement of a touch sensor such as for use in a touch screen.

FIG. 2 shows the electrodes in the touch sensor in more detail. A plurality of transmit electrodes Tx0, Tx1, Tx2, Tx3, Tx4 are arranged substantially parallel with one another, and are also arranged perpendicular to a plurality of receive electrodes Rx0, Rx1, Rx2, Rx3, Rx4. The transmit electrodes and the receive electrodes are arranged in a regular grid pattern commonly known as a matrix pattern, however other patterns will be envisaged such as bar and stripe patterns. It will be appreciated that the horizontal and vertical orientation of the transmit electrodes and receive electrodes respectively may be swapped without affecting functionality. The plurality of receive electrodes are positioned substantially parallel to each other, forming electrode intersections with the transmit electrodes such as at 220 and 210. The transmit electrodes are coupled to a signal generating means 230. The signal generating means 230 is used to provide a drive signal voltage to be applied to the transmit electrodes, and comprises a signal generating circuit such as a voltage source. The receive electrodes are coupled to a sensing means 240. The sensing means 240 comprises a sensing circuit arranged to measure changes in mutual capacitance at each intersection 220, 210 caused a conductor such as a finger or a stylus. The receive electrodes in this instance form a bridge over the transmit electrodes at the intersections 220, 210, however it will be appreciated that the transmit electrodes may overlap the receive electrodes. As explained above, in a touch sensor arrangement a drive signal voltage is applied on the transmit electrodes, creating a mutual capacitance at intersections 220, 210 between the transmit and receive electrodes. Touch events are geographically distinguishable between intersections 220 and 210 by the difference in measured capacitance at each respective intersection. Each intersection is individually addressable by the sensing means 240.

Figure 3A:
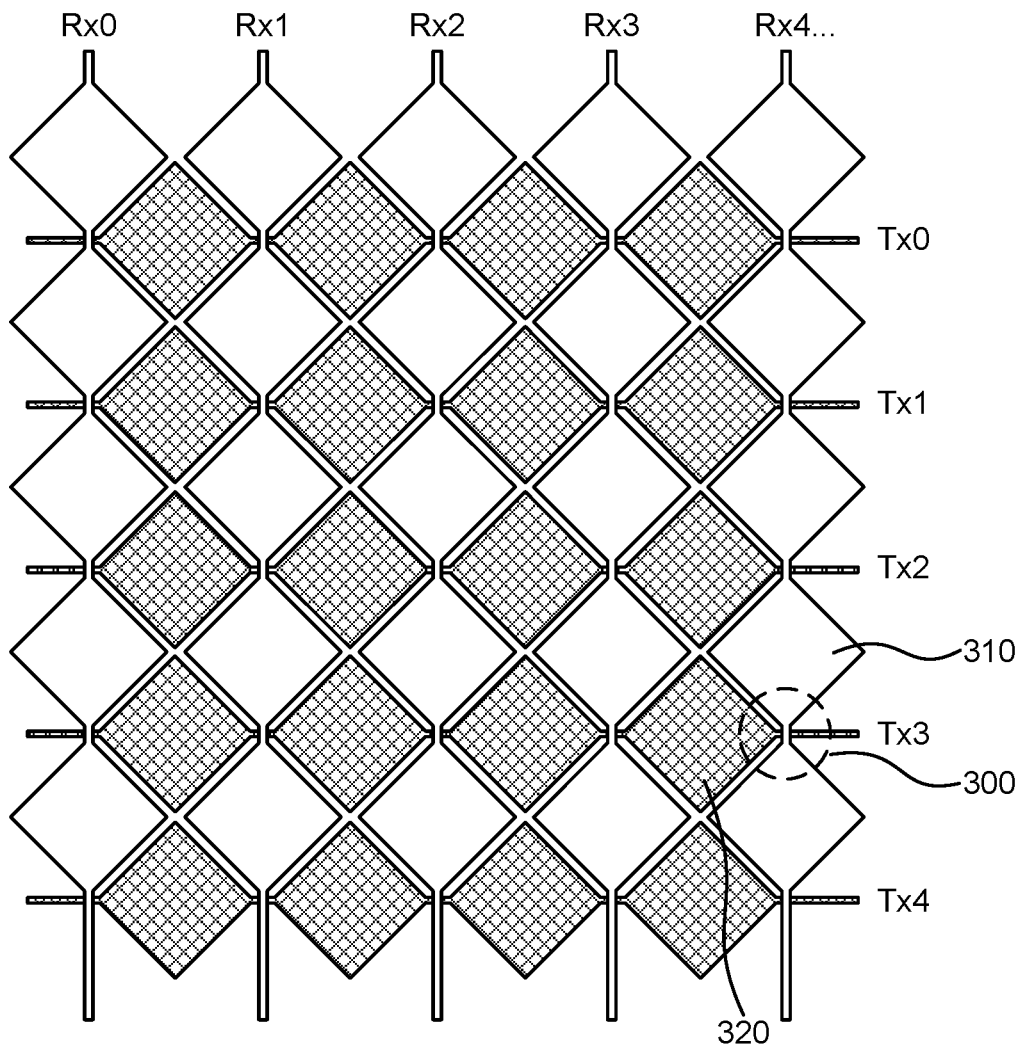
FIG. 3A is a schematic diagram of alternative electrode arrangement of a touchscreen.

FIG. 3A shows another example of an electrode arrangement in a touch sensor. In this example, each of the transmit and receive electrode comprise a series of repeating diamond-shaped conductive elements 310, 320 connected by bridge sections. Including the diamond-shaped conductive elements 310, 320 increases the surface of the electrodes, and thus reduces the impedance of the electrodes allowing an improved touch sensing performance. Intersections between receive and transmit electrodes are formed where each of the respective bridge sections overlap, such as at 300. As above, each of the transmit and receive electrodes is coupled to a signal generating means and a sensing means respectively.

Figure 3B:
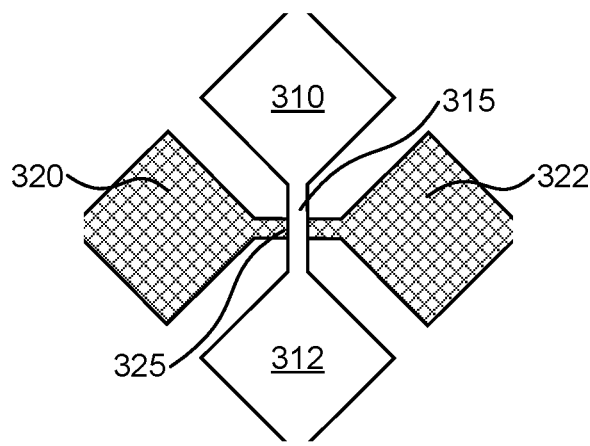
FIG. 3B is a schematic diagram of a section of electrode arrangement of a touchscreen.

FIG. 3B shows the intersection 300 in more detail. As shown, the receive electrode comprises body sections 310, 312 connected by a bridge section 315. Similarly, each of the transmit electrodes comprise body sections 320, 322 connected by a bridge 325. An intersection is formed where the receive bridge section 315 overlaps the transmit body section 325, forming a mutual capacitance between the two bridge sections 315, 325. As described previously, each of the intersections is individually addressable by the sensing means to detect changes in mutual capacitance between the transmit and receive bridge sections caused by a touch event, such as an approach by a conductor.

Figure 4A:
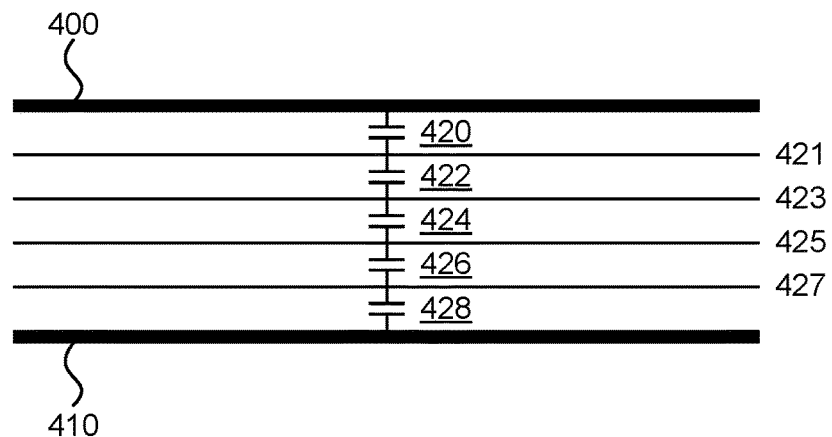
FIG. 4A is a diagram of a transmit and receive electrode arrangement.

FIG. 4A illustrates a mutual capacitance example between a transmit electrode 400 and a receive electrode 410. The transmit electrode 400 and receive electrode 410 are arranged in either the regular grid or diamond patterns as illustrated in FIGS. 2 and 3A-B. Generally, the electrodes 400 and 410 are separated by an air gap or by a dielectric substrate, allowing a junction capacitance $C_{junc}$ to form between the electrodes 400, 410.

In accordance with the present disclosure, a method of circuit modelling is used to represent the mutual capacitance between the electrodes 400, 410, herein referred to as the 'New Finger Effect Model'.

It will be appreciated that the junction capacitance $C_{junc}$ between the electrodes 400, 410 may be modelled as a series of N interconnected virtual capacitors 422, 424, 426, 428 connected in series, each with a value of $N \cdot C_{junc}$. In this instance, N is illustrated as 5, however it will be appreciated that N may comprise any number of interconnected capacitors including up to infinity.

Modelling the junction capacitance $C_{junc}$ as a series of interconnected virtual capacitors is seen as the equivalent of placing N−1 conductive plates 421, 423, 425, 427 between the electrodes 400, 410. Each conductive plate 421, 423, 425, 427 is thought of as being placed perpendicular to the electrical field lines between the electrodes 400, 410 so as not to influence the electrical field and the junction capacitance between the electrodes 400, 410. Each conductive plate 421, 423, 425, 427 has a thickness substantially smaller than the thickness of the capacitors 422, 424, 426, 428.

Taking the capacitor's plate area as infinite, the conductive plates 421, 423, 425, 427 are arranged parallel to the plates of the interconnected capacitors 420, 422, 424, 426, 428. In a finite plate capacitor, the electrical field lines bend near the edges, and thus the virtual conductive plates also bend near the capacitor edges.

It is appreciated that there are an infinite number of surfaces between electrodes 400, 410 that are perpendicular to the electrical field lines, and thus will have constant potential over them. This constant potential makes moving charges across these surfaces energy-free, allowing the junction capacitance to be modelled as conductive plates.

Figure 4B:
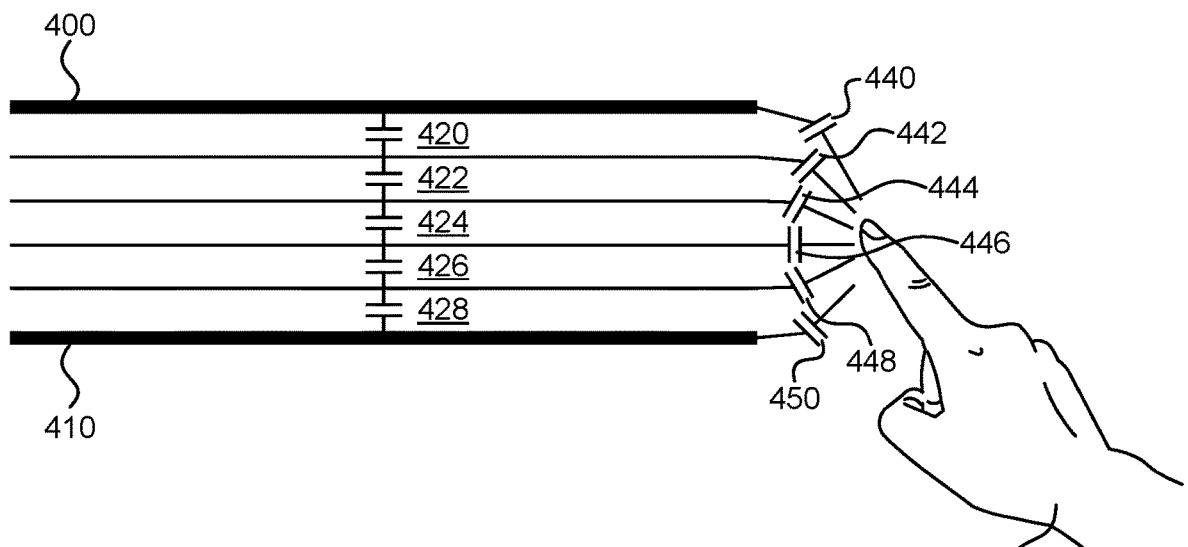
FIG. 4B is a diagram of a transmit and receive electrode arrangement and conductor.

FIG. 4B shows the effect of an approaching conductor 430, such as a finger or stylus, on the capacitances between the electrodes 400, 410, and demonstrates a 'New Finger Effect Model' in conjunction with a conductor. On approach by the conductor, some of the virtual conductive plates between the electrodes 400 and 410 is coupled to the conductor 430. The conductor 430 thus forms a capacitive coupling with each of the conductive plates 421, 423, 425, 427 and the electrodes 400, 410, forming conductor capacitances 440, 442, 444, 446, 448, 450.

Figure 5:
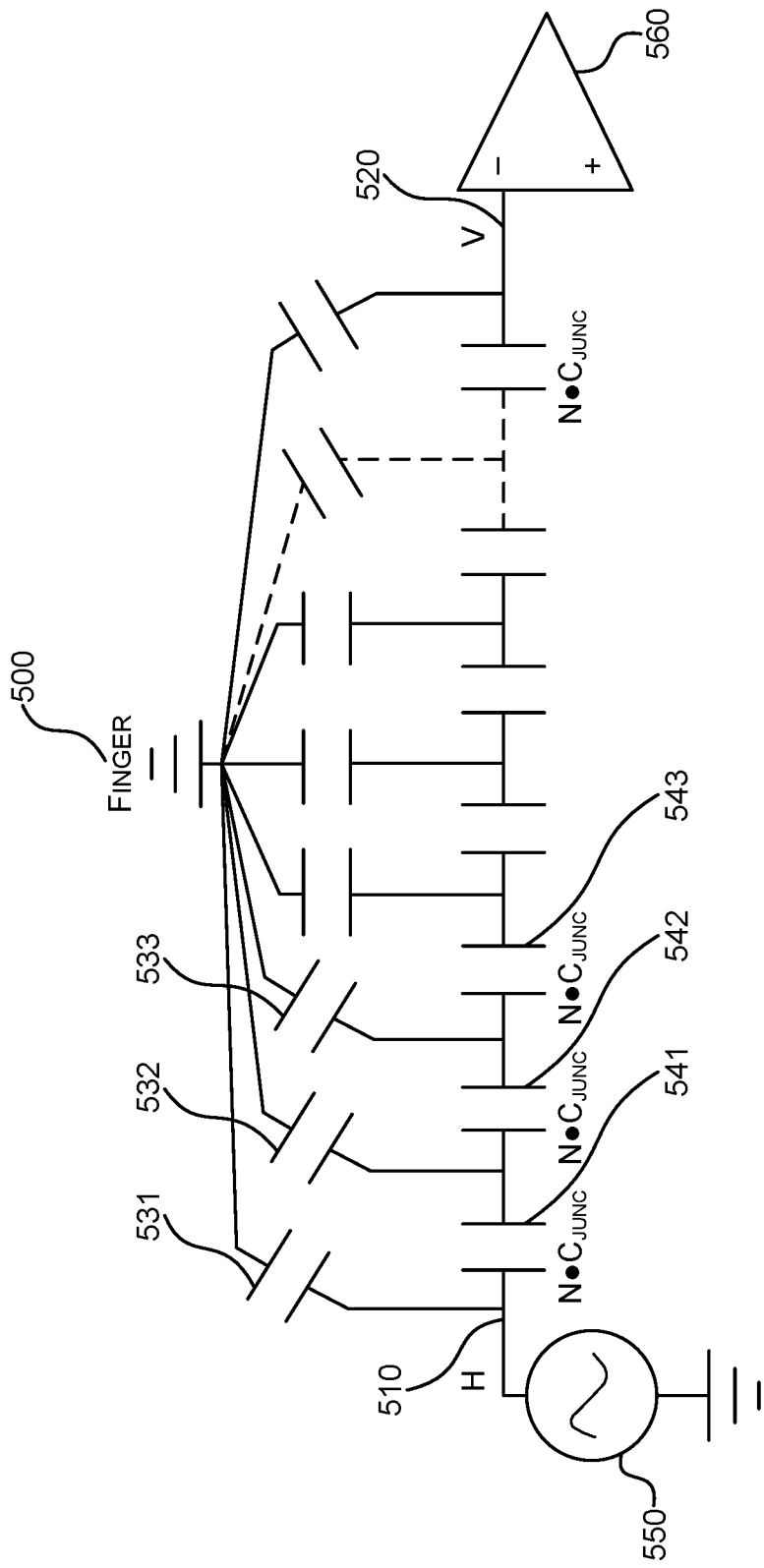
FIG. 5 is a circuit diagram of a touch sensor arrangement.

FIG. 5 illustrates an equivalent circuit diagram of the above effect of the conductor capacitances 440-450 in a touch sensor arrangement. FIG. 5. shows a conductor 500, such as a human finger or a stylus, creating capacitive couplings 531, 532, 533 . . . between electrode points 510, 520. The circuit shown in FIG. 5 further comprises a signal generating means in the form of a voltage source 550, representing the signal transmitted to the transmit electrode, and a sensing means 560 comprising a trans-impedance amplifier, as is seen in a touch sensor arrangement. The presence of the conductor 500 creates a capacitive coupling 531, 532, 533 . . . between each of the interconnected capacitors 541, 542, 543 . . . , which represent the capacitive couplings between the conductor 500 and the conductive plate equivalents of the interconnected capacitors.

It will be appreciated that as the conductor 500 is grounded, there is no effect on the signal level at the electrodes 510, 520, because electrode 510 is connected to an ideal voltage source, and electrode 520 is the virtual ground of the trans-impedance amplifier.

Figure 6:
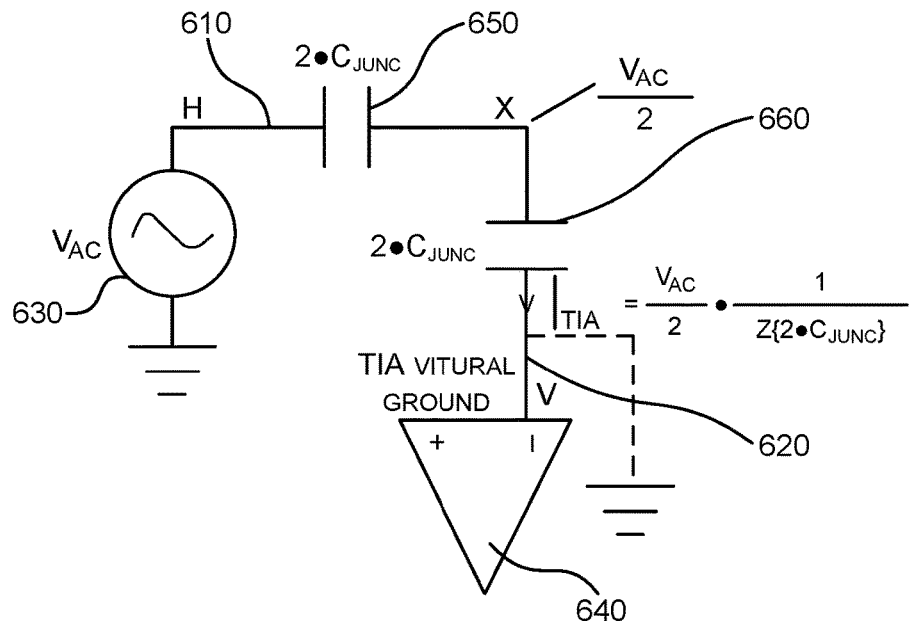
FIG. 6 is a circuit diagram of a touch sensor arrangement.

FIG. 6 shows a circuit equivalent of a touch sensor electrode arrangement where there is a single virtual conductive plate between transmit and receive electrode points 610, 620. The circuit comprises a voltage source 630 providing a signal voltage of $V_{ac}$, and a sensing means comprising a trans-impedance amplifier 640. The circuit also models the capacitance between the electrodes 610, 620 using N=2, i.e. two equal interconnected capacitors 650, 660, each with a capacitance of $2 \cdot C_{junc}$.

As can be seen in FIG. 6, without the presence of a conductor the circuit functions as a potential divider at the point X. The input to the trans-impedance amplifier 640 is modelled as virtual ground. As the capacitances 650, 660 are equal, the voltage at the point X between 650 and 660 is divided in half and is equivalent to $V_{ac}/2$.

Thus, in the absence of a conductor, current through the trans-impedance amplifier 640 is calculated as:

$$I_{TIA} = \frac{(V_X - V_V)}{Z\{2 \cdot C_{junc}\}} = \frac{\frac{V_{AC}}{2}}{\frac{1}{\omega \cdot 2 \cdot C_{junc}}} = V_{AC} \cdot \omega \cdot C_{junc}$$

Which is expressed in words as, the current through the trans-impedance amplifier is equal to the voltage across the bottom capacitor (found from the voltage at the point x minus the voltage at the virtual ground V) divided by the impedance of the bottom capacitor given by $2 \cdot C_{junc}$; which simplifies to the voltage of the alternating current source times the angular frequency times the junction capacitance.

Figure 7:
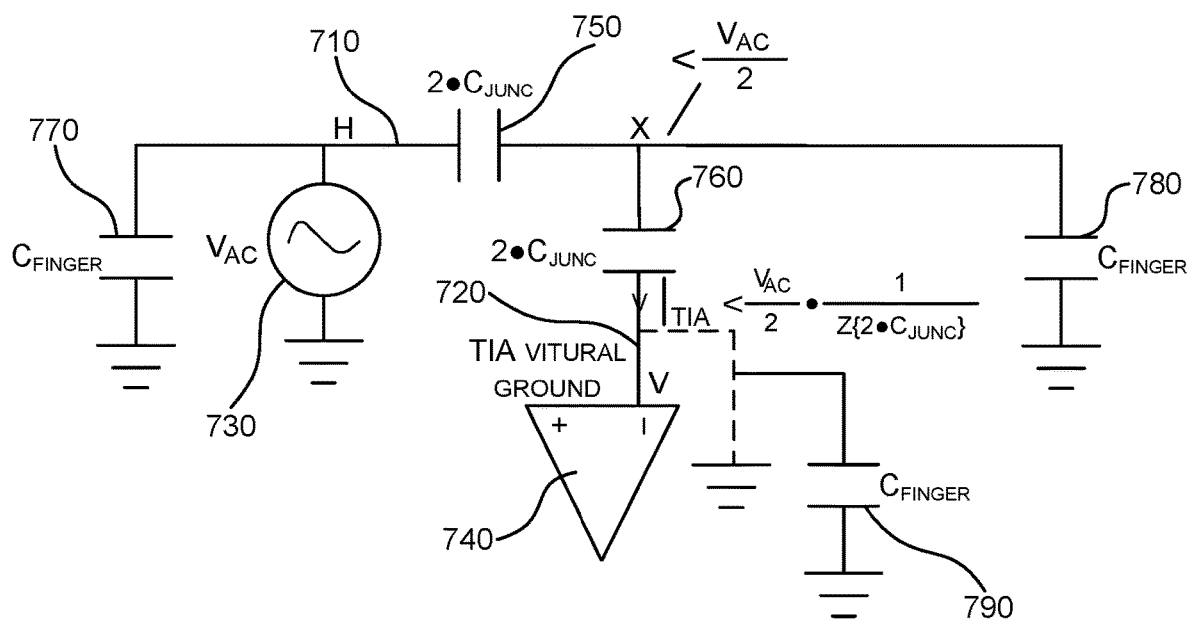
FIG. 7 is a circuit diagram of a touch sensor arrangement.

The effect of an approaching conductor can be seen in FIG. 7.

FIG. 7 illustrates a circuit equivalent of a touch sensor electrode arrangement where there is a single virtual conductive plate between electrode points 710, 720. The circuit comprises a voltage source 730 providing a signal voltage of $V_{AC}$, and a sensing means comprising a trans-impedance amplifier 740. The circuit also models the capacitance between the electrodes 710, 720 using N=2, i.e. two equal interconnected capacitors 750, 760, each with a capacitance of $2 \cdot C_{junc}$. A conductor is present in FIG. 7 and its effects are also modelled. An approaching conductor creates capacitive coupling 770 between electrode 710 and ground, capacitive coupling 790 between electrode 720 and ground, and capacitive coupling 780 between interconnected capacitors 750, 760 and ground. It is appreciated that the capacitive coupling 770 between electrode 710 and ground caused by the conductor will not affect the current seen at the trans-impedance amplifier 740, as the capacitance to the electrode 710 will load the voltage source 730 but not affect its output (assuming the voltage source 730 is ideal). Similarly, the capacitive coupling 790 between the electrode 720 and ground will not affect the current seen at the trans-impedance amplifier 740 as it is equivalent to a capacitive coupling between ground and virtual ground. The voltage across the capacitor 790 will therefore be approximately zero, and thus will not draw any current.

However, the capacitive coupling at 780 caused by the conductor will affect the current seen at the trans-impedance amplifier 740. For example, to simplify the calculation, assume the capacitance at 780 is $C_{finger}=2 \cdot C_{junc}$. This creates a voltage divider between capacitor 750 which is equal to $2 \cdot C_{junc}$, and the capacitance of capacitors 760 and 780 in parallel to each other which equals to $4 \cdot C_{junc}$. This voltage divider results in a voltage amplitude of $V_{AC}/3$ at point X. Therefore, the current seen at the trans-impedance amplifier may be calculated as:

$$I_{TIA} = \frac{(V_X - V_V)}{Z\{2 \cdot C_{junc}\}} = \frac{\frac{V_{AC}}{3}}{\frac{1}{\omega \cdot 2 \cdot C_{junc}}} = \frac{2}{3} \cdot V_{AC} \cdot \omega \cdot C_{junc}$$

Which is expressed in words as the current at the trans-impedance amplifier is equal to the voltage across the bottom capacitor (found from the voltage at the point x minus the voltage at the virtual ground V) divided by the impedance of the bottom capacitor given by $2 \cdot C_{junc}$; which simplifies to two thirds of the voltage of the alternating current source times the angular frequency times the junction capacitance.

The current seen at the trans-impedance amplifier 740 is thus lower with the presence of a conductor than without. A touch event may therefore be more robustly detected by measuring a decrease in current at the trans-impedance amplifier.

Figure 8:
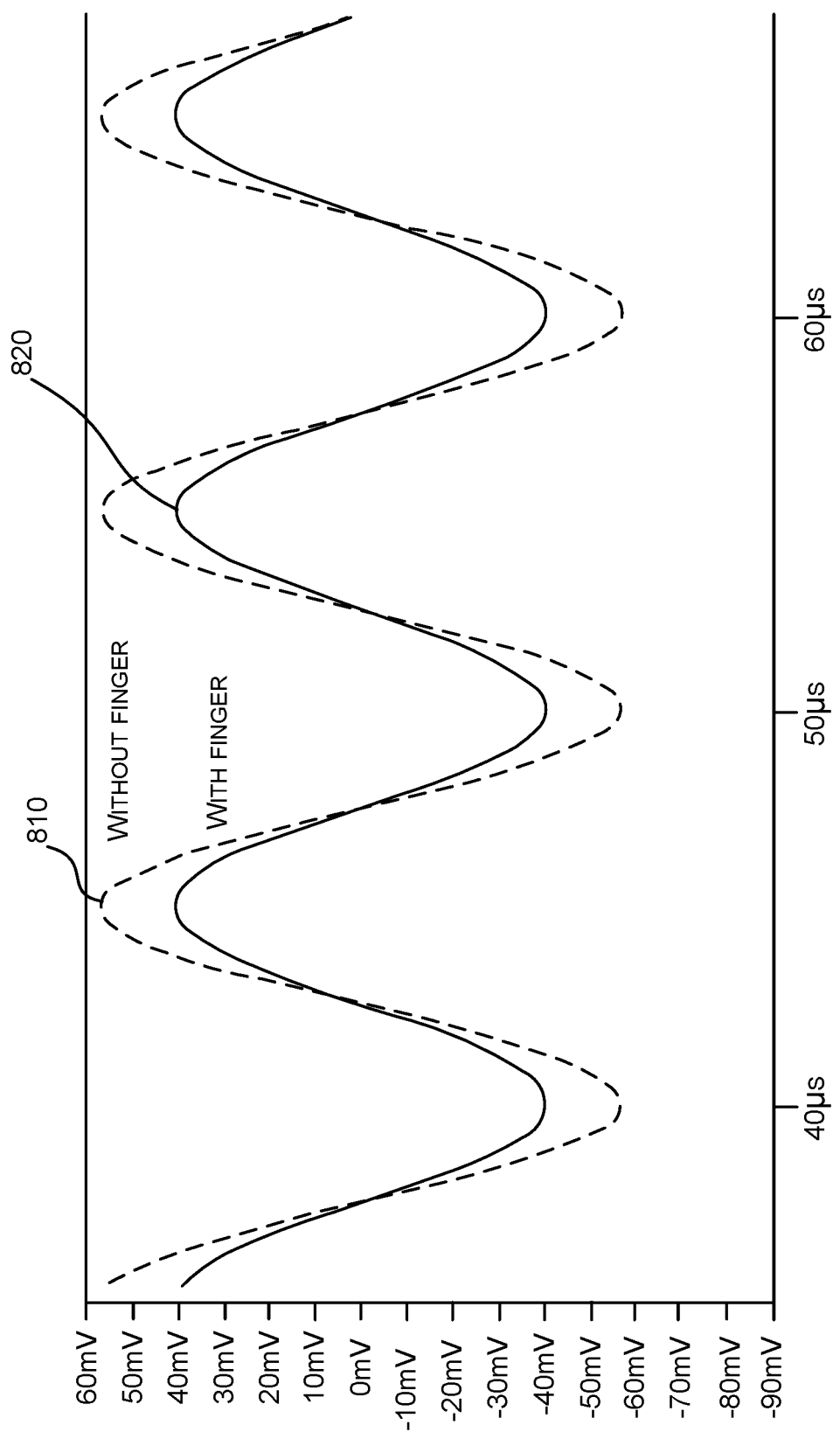
FIG. 8 is graph of simulated voltage traces a touch sensor circuit.

FIG. 8 shows two simulated output voltage traces 810, 820 of the circuits illustrated in FIGS. 6 and 7 respectively. The simulation was performed with parameter values of N=2, $C_{junc}$=0.6 PF (pico Farads), $C_{finger}$=1 pF, F=100 kHz (kilo Hertz), $V_{ac}$=15V (volts), $R_f$=20 KΩ (kilo Ohms). As is illustrated, the voltage trace 820 corresponding to a touch sensor electrode arrangement in the presence of a conductor is of smaller amplitude than the voltage trace 810 corresponding to the touch sensor electrode arrangement absent a conductor. This difference in voltage amplitude may be used to determine a touch event on the touch sensor electrode arrangement. It can thus be seen that by maximizing the capacitance between the approaching conductor and the area in between the transmitting and receiving electrodes, a higher sensitivity can be achieved for the detection of touch events. A touch event is therefore more robustly and more accurately detected responsive to the increase in sensitivity.

Figure 9A:
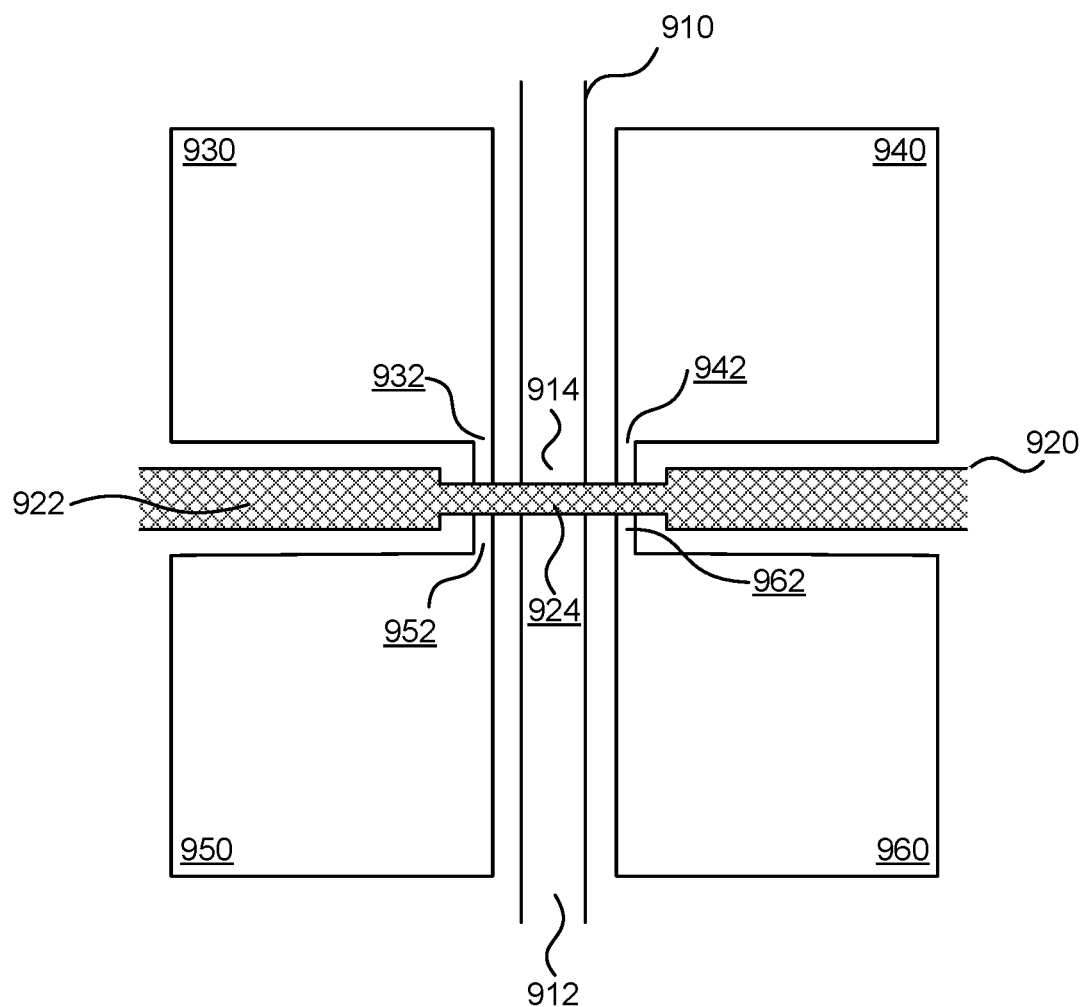
FIG. 9A is a plan-view schematic diagram of an apparatus for sensing touch events.

FIG. 9A shows a plan view of an apparatus for sensing a touch event. The apparatus utilizes the 'New Finger Effect Model' as described previously and comprises a transmit electrode 910, a receive electrode 920, and one or more regions of electrically floating conductive material 930, 940, 950, 960.

The transmit electrode 910 comprises a transmit body section 912 and a transmit bridge section. The receive electrode 920 similarly comprises a receive body section 922 and a receive bridge section 924. The transmit electrode 910 and receive electrode 920 comprise a conductive element capable of carrying a signal, such as Indium-Tin-Oxide, copper or aluminium. In this example, the transmit electrode 910 and receive electrode 920 are positioned such that they are substantially perpendicular to each other, such as in a grid or matrix pattern. However, it is recognized that arrangements where the transmit electrode 910 and receive electrode 920 are not perpendicular are workable.

The apparatus comprises a plurality of transmit electrodes 910 and receive electrodes 920. Furthermore, a transmit electrode 910 may comprise a plurality of transmit body sections and transmit bridge sections. Similarly, a receive electrode 920 may comprise a plurality of receive body sections and receive bridge sections.

The transmit electrode 910 is arranged to carry a signal. The signal is provided by a signal generating means, such as a signal generating circuit comprising a voltage source. The receive electrode 920 is arranged to receive the signal via coupling with the transmit electrode 910. The receive electrode 920 is coupled to a signal sensing means in use, such as a signal sensing circuit comprising a trans-impedance amplifier. The signal sensing means is arranged to detect variations in the received signal at the receive electrodes. The signal coupling between transmit electrode 910 and receive electrode 920 is achieved via an electrostatic coupling between the transmit electrode 910 and the receive electrode 920, as will be explained later. In this way, the electrodes are arranged to provide a mutual capacitance coupling between the transmit electrode 910 and receive electrode 920 for use as a touch sensor.

The transmit bridge section 914 and receive bridge section 924 are arranged to cross one another such that a gap is formed between the transmit bridge section 914 and the receive bridge section 924.

The gap comprises a three-dimensional area bounded by the edges of the transmit bridge section 914 and the receive bridge section 924. The gap comprises a three-dimensional area with a height and width comprising the lengths of the transmit bridge section 914 and the receive bridge section 924 respectively, and a depth comprising the difference in elevation of the transmit bridge section 914 and the receive bridge section 924.

The transmit bridge section 914 is physically isolated from the receive bridge section 924. The transmit bridge section 914 thus forms an electrode intersection with the receive bridge section 924, allowing a mutual capacitance to form between the bridge sections. As described previously, changes in this mutual capacitance are measurable by the sensing means when detecting touch events. In some configurations, an air gap is thus present between the transmit bridge section 914 and the receive bridge section 924. In other configurations, a substrate, such as a dielectric, is present between the transmit bridge section 914 and the receive bridge section 924 in addition to the gap.

Although the transmit bridge section 914 is illustrated as underneath the receive bridge section 924, it will be appreciated that the configuration of the transmit bridge section 914 and receive bridge section 924 are in other orders in some examples. In an example the receive bridge section 924 is positioned underneath the transmit bridge section 914. It will be appreciated that although the transmit bridge section 914 is illustrated as the same width as the transmit body section 912, the transmit bridge section 914 and the transmit body section 912 may be of any width relative to each other. Similarly, although the receive bridge section 924 is illustrated as being of a thinner width than the receive body section 922, the receive bridge section 924 may be of any width relative to the receive body section 922. The surface area of the transmit body section 912 is greater than the surface area of the transmit bridge section 914 in some examples in order to reduce impedance. Similarly, the surface area of the receive body section 922 is greater than the surface area of the receive bridge section 924 in some examples.

In an example, the transmit body section 912 and the transmit bridge section 914 comprise a flat region of material comprising the electrode, i.e. the transmit body section 912 and transmit bridge section 914 are arranged in the same plane. In such configurations, the receive body section 922 is positioned in the same plane as the transmit body section 912 and the transmit bridge section 914. This gives the benefit that single-layered, compact, planar constructions of the touch panel sensor are achieved which is easier and cheaper to manufacture, and useful for deployments where there are space and size constraints.

In some configurations, the transmit body section 912 and the receive body section 922 are positioned in the same plane. In this case, the transmit body section 912 and receive body section 922 have substantially the same elevation when viewed from the side. In other configurations, the transmit body section 912 is on a separate plane to the receive body section 922 such that the transmit body section 912 has a higher or lower side elevation than the receive body section 922. In this way the overall size and shape of the touch panel sensor is configured such that it is suitable for use in apparatus where there are particular size and shape requirements.

The one or more regions of floating conductive material 930, 940, 950, 960 are positioned in proximity to the transmit body section 912 and the receive body section 922. For example, the regions 930, 940, 950, 960 may be placed in the gaps between the transmit body section 912 and the receive body section 922.

Each of the regions of floating conductive material 930, 940, 950, 960 comprises a connected member of floating conductive material 932, 942, 952, 962 arranged to extend into the gap between the transmit bridge section 914 and the receive bridge section 924. The member 932, 942, 952, 962 may be positioned such that it extends directly underneath the receive bridge section 924, in configurations where the receive bridge section 924 overlaps the transmit bridge section 914.

Each region of floating conductive material 930, 940, 950, 960 may be connected to more members 934, 944, 954, 964 of floating conductive material which extend into the gaps between other neighboring junctions of transmit bridge sections and receive bridge section.

By extending the regions of floating conductive material 930, 940, 950, 960 into the gap between the transmit bridge section 914 and receive bridge section 924, on approach from a conductor such as a stylus or human finger, a capacitive coupling is created between the conductor and the regions of floating conductive material. As described previously, the area between the transmit electrode 910 and the receive electrode 920 is modelled as a series of interconnected capacitors. By including the regions of floating conductive material in the gap between the transmit electrode 910 and the receive electrode 920, this is equivalent to increasing the capacitive coupling of the conductor to the interconnected capacitors between the transmit electrode 910 and receive electrode 920. Thus, any current seen at a trans-impedance amplifier coupled to the receive electrode 920 is greatly reduced, allowing a greater signal variation to be seen on approach by the conductor and advantageously allowing a higher sensitivity to be achieved when detecting touch events. This is achieved even though the transmit and receive electrodes are long and thin and positioned substantially perpendicular to one another. A touch event is therefore more robustly detected responsive to the increased sensitivity.

One or more of the transmit electrode 910, the receive electrode 920, and the regions of floating conductive material 930, 940, 950, 960 comprise a conductive and substantially transparent material such as indium tin oxide (ITO). Advantageously, this allows the apparatus to be used in conjunction with a user interface or display, such as with mobile or tablet displays.

Figure 9B:
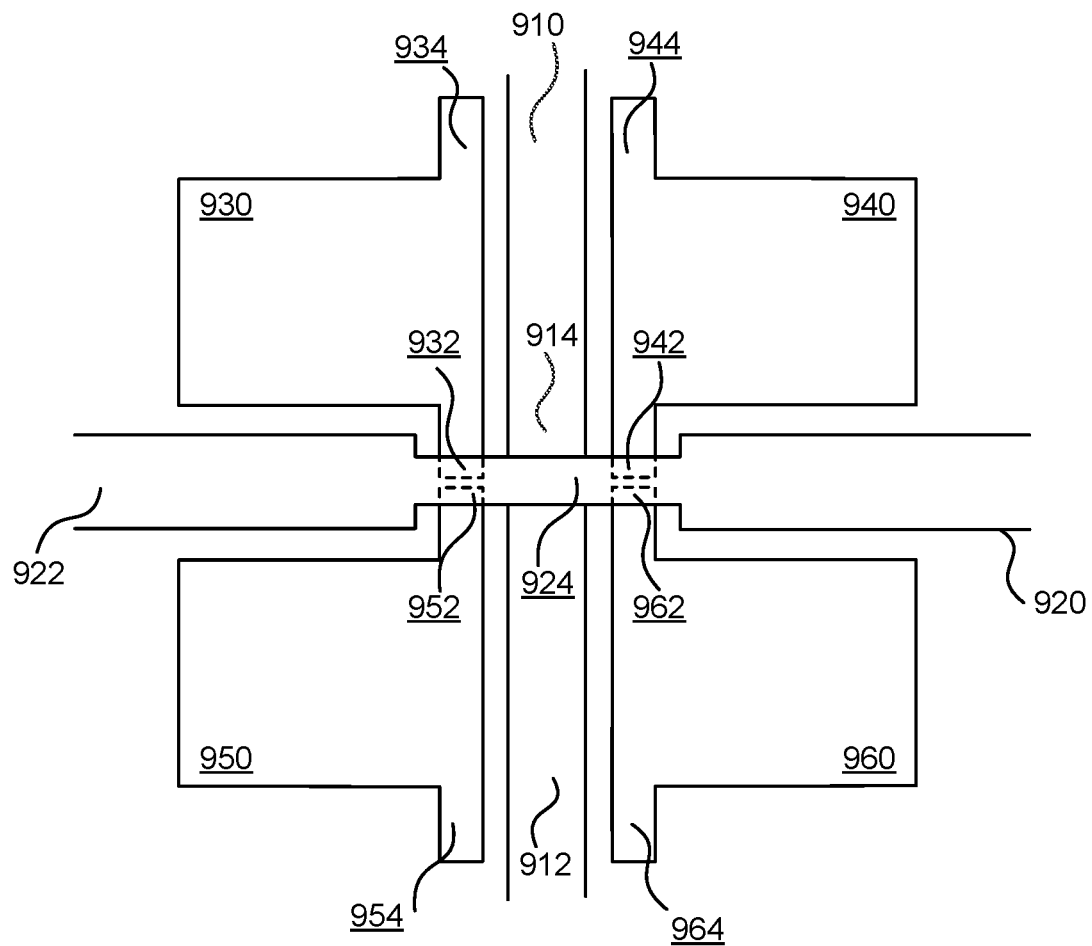
FIG. 9B is a plan-view cross-sectional diagram of an apparatus for sensing touch events.

In examples, the surface area of individual ones of the regions of floating conductive material 930, 940, 950, 960 is substantially larger than a surface area of the transmit bridge section 914 or receive bridge section 924 in order to maximize the capacitive coupling between the floating conductive material 930, 940, 950, 960 and the conductor, thus achieving a higher touch sensitivity. The arrangement of the regions of floating conductive material 930, 940, 950, 960 therefore seek to maximize utilization of the space between the transmit electrode 910 and the receive electrode 920. In addition, such an arrangement advantageously allows the apparatus to be substantially transparent. This is because regions of a substrate supporting the electrodes and the regions of floating conductive material is substantially covered by the same type of transparent material (the electrodes and floating conductive material) which provides a homogeneous transparency level of the touch sensor. However, the uncovered regions of the substrate have potential visibility as they are not covered by any conductive material. These are the regions between the electrodes and the floating conductive regions. Because the uncovered regions are substantially narrower than the conductive electrodes and floating material, an end user does not notice them, and has an even perception of the display FIG. 9B shows a cross-sectional plan view of the apparatus. As shown, the regions of floating conductive material 930, 940, 950, 960 are arranged to comprise members 932, 942, 952, 962 extending into the gap between the transmit bridge section 914 and the receive bridge section 924. The members 932, 942, 952, 962 are also arranged to extend directly below the receive bridge section 924. Each region of the floating conductive material 930, 940, 950, 960 is electrically isolated from the transmit electrode 910 and receive electrode 920.

Figure 9C:
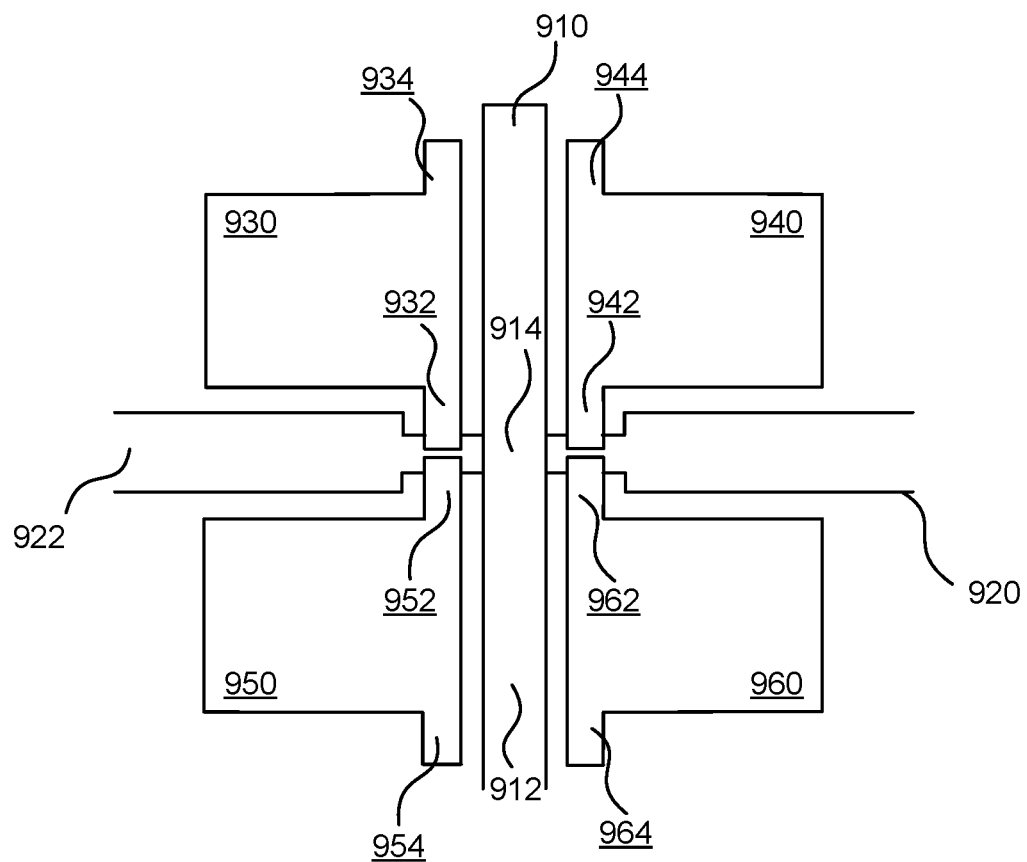
FIG. 9C is a plan-view schematic diagram of an apparatus for sensing touch events from below.

FIG. 9C shows a plan view of the apparatus from below. As shown, the receive bridge section is arranged to cross over the transmit bridge section 914. In addition, the members 932, 942, 952, 962 arranged to extend into the gap between the receive bridge section 924 and the transmit bridge section 914.

Figure 9D:
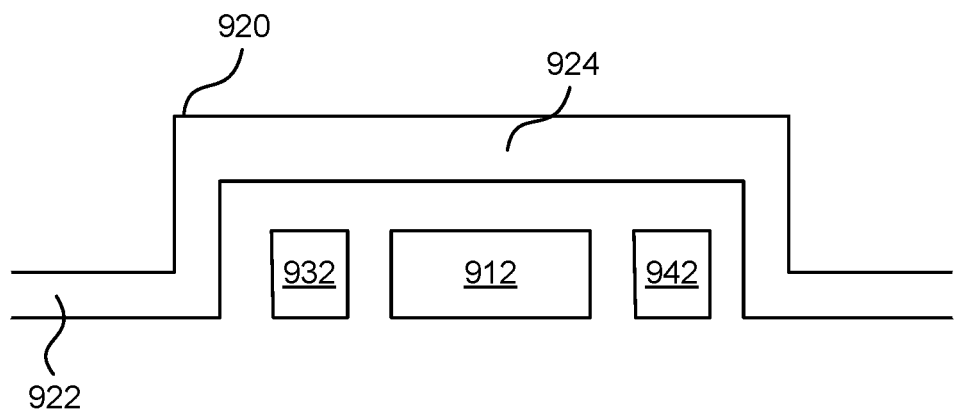
FIG. 9D is a side-view schematic diagram of an apparatus for sensing touch events.

FIG. 9D shows a side view of the apparatus. As shown, the receive body section 922 is arranged in the same plane as the transmit body section 912. The receive bridge section 924 is arranged to cross and overlap the transmit bridge section 914, forming a gap between the transmit bridge section 914 and the receive bridge section 924. The regions of floating conductive material 932, 942 are arranged to extend into the gap in order to maximize the capacitive coupling between conductor and the area between the transmit electrode 910 and receive electrode 920.

In various examples the apparatus comprises a plurality of transmit electrodes 910, receive electrodes 920, and regions of floating conductive material 930, 940, 950, 960 arranged as above in a repeating pattern.

Figure 10:
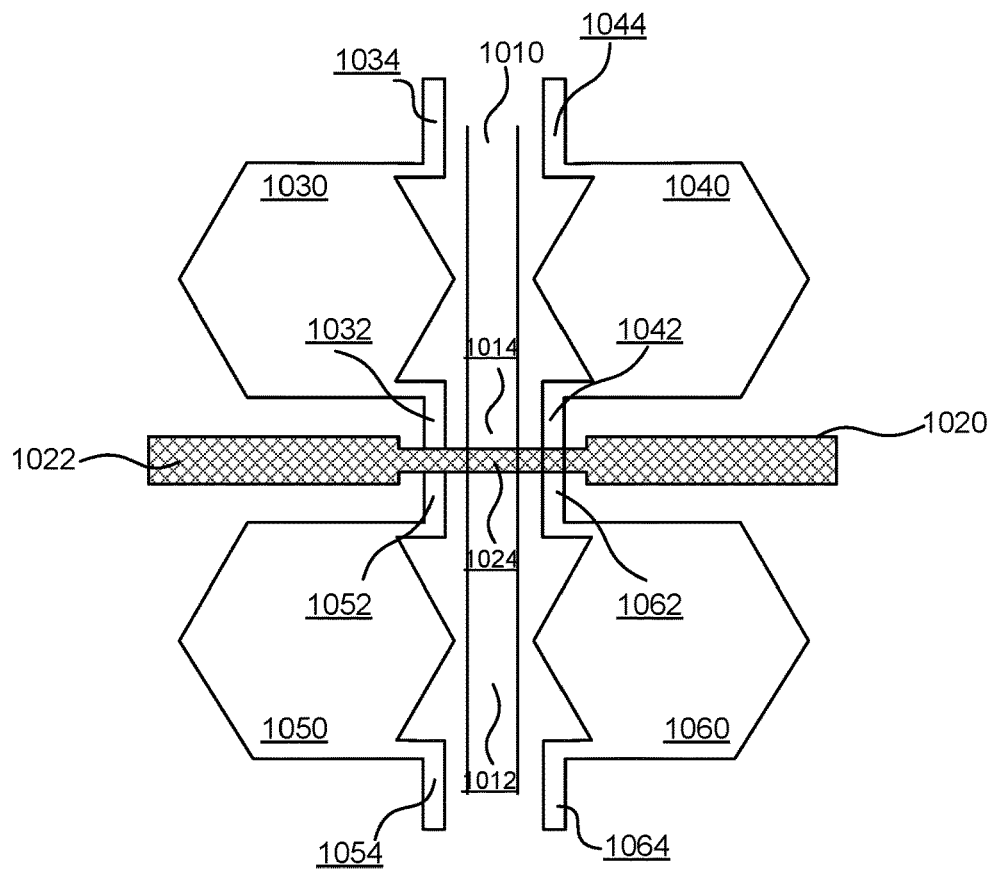
FIG. 10 is a plan-view schematic diagram of an apparatus for sensing touch events.

Although in FIG. 9A-9D the regions of floating conductive material are illustrated as rectangular, it is appreciated that various shapes of floating conducting region and configurations of the regions of floating conductive material may be used. For example, FIG. 10 illustrates an apparatus for sensing touch events comprising a transmit electrode 1010 and a receive electrode 1020. The transmit electrode similarly comprises a transmit body section 1012 and a transmit bridge section 1014 arranged to cross a receive electrode 1020 similarly comprising a receive body section 1022 and a receive bridge section 1024 such that a gap is formed between the transmit bridge section 1014 and the receive bridge section 1024. Regions of floating conductive material 1030, 1040, 1050, 1060 are also provided in the form of hexagon shapes, and comprise a member of conductive material extending into the gap between the transmit bridge section 1014 and the receive bridge section 1024. In this configuration, the regions of floating conductive material are hexagonal.

Each region of floating conductive material 1030, 1040, 1050, 1060 may be connected to more members of floating conductive material 1034, 1044, 1054, 1064 which extend into the gaps between other neighboring junctions of transmit bridge sections and receive bridge section. Thus some or all of the floating conductive material regions have more than one member routed towards more than one crossing of transmitting and receiving electrodes.

Figure 11:
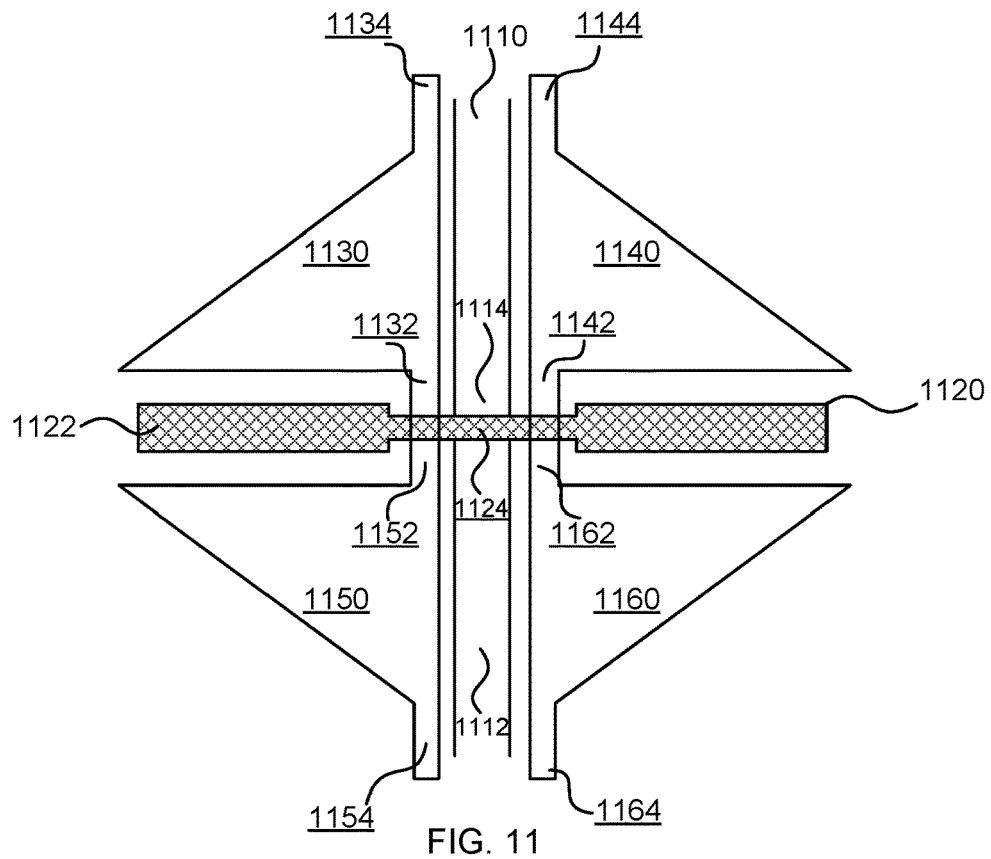
FIG. 11 is a plan-view schematic diagram of an apparatus for sensing touch events.

FIG. 11 illustrates an apparatus for sensing touch events comprising a transmit electrode 1110 and a receive electrode 1120. The transmit electrode similarly comprises a transmit body section 1112 and a transmit bridge section 1114 arranged to cross a receive electrode 1120 similarly comprising a receive body section 1122 and a receive bridge section 1124 such that a gap is formed between the transmit bridge section 1114 and the receive bridge section 1124. Regions of floating conductive material 1130, 1140, 1150, 1160 are also provided, and comprise a member of conductive material extending into the gap between the transmit bridge section 1114 and the receive bridge section 1124. In this configuration, the regions of floating conductive material are triangular. Each region of floating conductive material 1130, 1140, 1150, 1160 may be connected to more members 1134, 1144, 1154, 1164 of floating conductive material which extend into the gaps between other neighboring junctions of transmit bridge sections and receive bridge section which are not shown in the figure.

Figure 12:
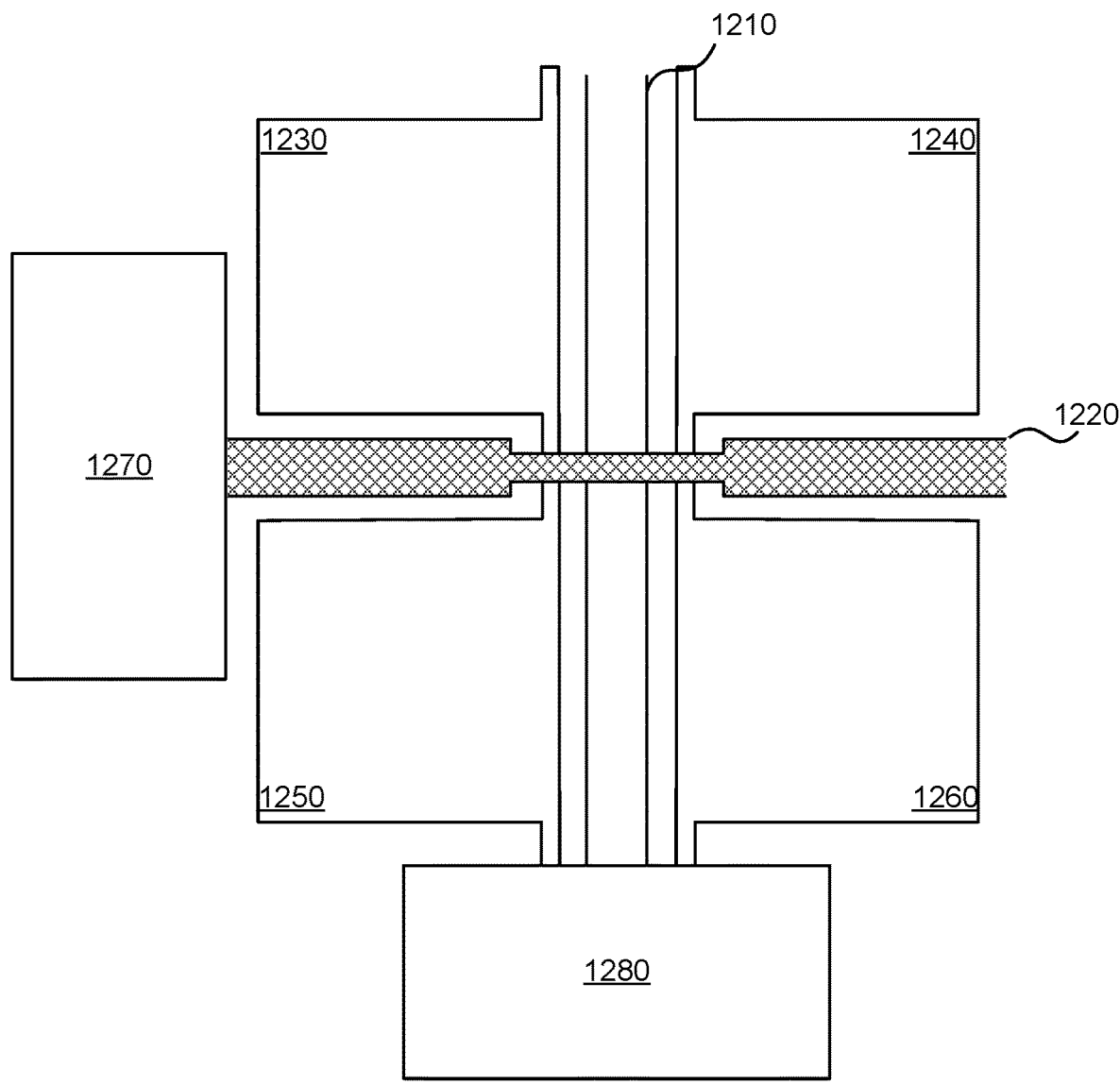
FIG. 12 is a plan-view schematic diagram of an apparatus for sensing touch events.

FIG. 12 illustrates an apparatus for sensing touch events. The apparatus comprises a transmit electrode 1210 arranged to carry a signal, the transmit electrode 1210 comprising a transmit body section and a transmit bridge section. The apparatus further comprises a receive electrode 1220 arranged to receive the signal via electrostatic coupling with the transmit electrode 1210, the receive electrode 1220 comprising a receive body section and a receive bridge section. The transmit electrode 1210 and receive electrode 1220 are arranged to cross such that a gap is formed between the transmit and receive bridge sections. The apparatus further comprises one or more regions of floating conductive material 1230, 1240, 1250, 1260 positioned in proximity to the transmit and receive body sections, each region comprising a member of conductive material extending into the gap. The apparatus further comprises a sensing means 1270 coupled to the receive electrode 1220 and arranged to detect variations in the received signal at the receive electrode 1220. The sensing means 1270 may comprise one of more of a trans-impedance amplifier, an analogue-to-digital converter, and a digital signal processor. The apparatus further comprises a signal generating means coupled to the transmit electrode 1210 and arranged to provide the signal. The signal generating means 1210 may comprise a voltage source. Each region of floating conductive material 1230, 1240, 1250, 1260 may be connected to more members of floating conductive material which extend into the gaps between other neighboring junctions of transmit bridge sections and receive bridge section.

Figure 13:
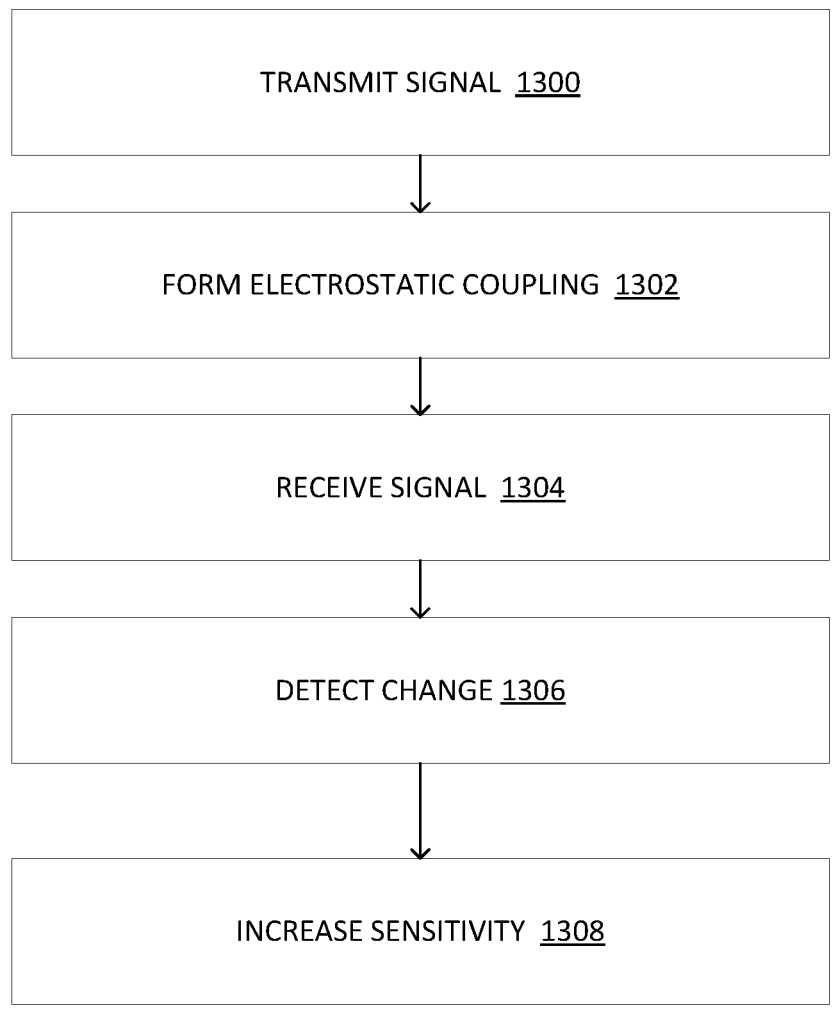
FIG. 13 is a flow diagram of a method of sensing a touch event.

FIG. 13 is a flow diagram of a method for sensing a touch event, comprising: transmitting 1300 a signal via one or more transmit electrodes; forming 1302 an electrostatic coupling between the transmit electrodes and receive electrodes at a gap formed between the transmit electrodes and receive electrodes where the transmit electrodes cross one or more receive electrodes; receiving 1304 the signal via the one or more receive electrodes; and detecting 1306 a change in the received signal when a conductor is introduced towards the gap; and increasing sensitivity 1308 to the change as a result of one or more regions of floating conductive material positioned in proximity to the transmit and receive electrodes, each region comprising a member of conductive material extending into the gap. A touch event is detected responsive to the change in the received signal being over a threshold amount and this is done with increased sensitivity due to the members of conductive material extending into the gap.

According to an embodiment of the present disclosure, there is provided a method for sensing a touch event. The method comprises the operations of transmitting a signal via one or more transmit electrodes arranged to cross one or more receive electrodes such that a gap is formed between the transmit electrodes and receive electrodes and an electrostatic coupling is formed between the transmit electrodes and receive electrodes, and receiving the signal via the one or more receive electrodes, wherein one or more regions of floating conductive material are positioned in proximity to the transmit and receive electrodes, each region comprising a member of conductive material extending into the gap.

According to an embodiment of the present disclosure, there is provided a touchscreen incorporating any one of the apparatus described above and shown in FIG. 9-12.

Alternatively or in addition to the other examples described herein, examples include any combination of the following:

An apparatus for sensing a touch event, comprising:

a plurality of transmit electrodes arranged to carry a signal, each of the transmit electrodes comprising a transmit body section and a transmit bridge section;

a plurality of receive electrodes arranged to receive the signal via electrostatic coupling with the transmit electrodes, each of the receive electrodes comprising a receive body section and a receive bridge section;

wherein individual ones of the transmit and receive bridge sections are arranged to cross such that a gap is formed between the transmit and receive bridge sections;

and one or more regions of floating conductive material positioned in proximity to the transmit and receive body sections, each region comprising a member of conductive material extending into the gap.

The apparatus described above, wherein for individual ones of the regions a surface area of the region of floating conductive material is larger than a surface area of the transmit bridge section.

The apparatus described above, wherein for individual ones of the regions a surface area of the region of floating conductive material is larger than a surface area of the receive bridge section.

The apparatus described above, wherein the transmit and receive body sections are arranged in the same plane.

The apparatus described above, wherein the one or more regions of floating conductive material and transmit body section are arranged in the same plane.

The apparatus described above, wherein the one or more regions of floating conductive material and receive body section are arranged in the same plane.

The apparatus described above, wherein the plurality of transmit electrodes and the plurality of receive electrodes and the one or more regions of floating conductive material are arranged in a repeating pattern.

The apparatus described above wherein the plurality of transmit electrodes and the plurality of receive electrodes and the one or more regions of floating conductive material are arranged such that exposed regions of a substrate supporting the plurality of transmit electrodes and the plurality of receive electrodes and the one or more regions of floating conductive material are minimal.

The apparatus described above wherein some or all of the floating conductive material regions have more than one member routed towards more than one crossing of transmitting and receiving electrodes.

The apparatus described above wherein the transmit and receive electrodes are substantially perpendicular to one another and are attenuated.

The apparatus described above comprising a sensor coupled to the receive electrodes the sensor arranged to detect variations in the received signal at the receive electrodes.

The apparatus described above, wherein the transmit and receive body sections are not arranged in the same plane.

The apparatus described above integral with a touch screen.

The apparatus described above integral with a computing device.

An apparatus for sensing a touch event, comprising:

a plurality of transmit electrodes arranged to carry a signal, each of the transmit electrodes comprising a transmit body section and a transmit bridge section;

a plurality of receive electrodes arranged to receive the signal via electrostatic coupling with the transmit electrodes, each of the receive electrodes comprising a receive body section and a receive bridge section;

wherein individual ones of the transmit and receive bridge sections are arranged to cross such that a gap is formed between the transmit and receive bridge sections;

one or more regions of floating conductive material positioned in proximity to the transmit and receive body sections, each region comprising a member of conductive material extending into the gaps;

and a sensing mechanism coupled to the receive electrodes and arranged to detect variations in the received signal at the receive electrodes.

A method for sensing a touch event, comprising:

transmitting a signal via one or more transmit electrodes;

forming an electrostatic coupling between the transmit electrodes and receive electrodes at a gap formed between the transmit electrodes and receive electrodes where the transmit electrodes cross one or more receive electrodes;

receiving the signal via the one or more receive electrodes;

detecting a change in the received signal when a conductor is introduced towards the gap; increasing sensitivity to the change as a result of one or more regions of floating conductive material positioned in proximity to the transmit and receive electrodes, each region comprising one or more members of conductive material extending into the gaps;

and detecting a touch event responsive to the increased sensitivity.

The method described above comprising forming the electrostatic coupling in a single plane comprising the transmit electrodes and receive electrodes.

The method described above comprising forming the electrostatic coupling where the transmit and receive electrodes are in different planes.

The method described above performed in a touch screen device.

The method described above performed in a computing device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

I claim:

1. An apparatus for sensing a touch event, comprising:
a plurality of transmit electrodes arranged to carry a signal, each of the transmit electrodes comprising a transmit body section and a transmit bridge section;
a plurality of receive electrodes arranged to receive the signal via electrostatic coupling with the transmit electrodes, each of the receive electrodes comprising a receive body section and a receive bridge section;
wherein individual ones of the transmit and receive bridge sections are arranged to cross such that a gap is formed between the transmit and receive bridge sections; and
one or more regions of floating conductive material positioned in proximity to the transmit and receive body sections, each region comprising one or more connected members of conductive material extending into the gap, a surface area of each of the one or more connected members being smaller than a surface area of a corresponding region of floating conductive material from which the connected member extends.

2. The apparatus of claim 1, wherein for individual ones of the regions a surface area of the region of floating conductive material is larger than a surface area of the transmit bridge section.

3. The apparatus of claim 1, wherein for individual ones of the regions a surface area of the region of floating conductive material is larger than a surface area of the receive bridge section.

4. The apparatus of claim 1, wherein the transmit and receive body sections are arranged in the same plane.

5. The apparatus of claim 1, wherein the one or more regions of floating conductive material and transmit body section are arranged in the same plane.

6. The apparatus of claim 1, wherein the one or more regions of floating conductive material and receive body section are arranged in the same plane.

7. The apparatus of claim 1, wherein the plurality of transmit electrodes and the plurality of receive electrodes and the one or more regions of floating conductive material are arranged in a repeating pattern.

8. The apparatus of claim 7 wherein the plurality of transmit electrodes and the plurality of receive electrodes and the one or more regions of floating conductive material are arranged such that exposed regions of a substrate supporting the plurality of transmit electrodes and the plurality of receive electrodes and the one or more regions of floating conductive material are minimal.

9. The apparatus of claim 1 wherein some or all of the floating conductive material regions have more than one member routed towards more than one crossing of transmitting and receiving electrodes.

10. The apparatus of claim 1 wherein the transmit and receive electrodes are substantially perpendicular to one another and are attenuated.

11. The apparatus of claim 1 comprising a sensor coupled to the receive electrodes the sensor arranged to detect variations in the received signal at the receive electrodes.

12. The apparatus of claim 1, wherein the transmit and receive body sections are not arranged in the same plane.

13. The apparatus of claim 1 integral with one of a touch screen or a computing device.

14. The apparatus of claim 1, wherein the one or more connected members of adjacent regions of floating conductive material extend directly underneath the receive bridge section in a non-abutting arrangement to form a gap between ends thereof.

15. An apparatus for sensing a touch event, comprising:
a plurality of transmit electrodes arranged to carry a signal, each of the transmit electrodes comprising a transmit body section and a transmit bridge section;
a plurality of receive electrodes arranged to receive the signal via electrostatic coupling with the transmit electrodes, each of the receive electrodes comprising a receive body section and a receive bridge section;

wherein individual ones of the transmit and receive bridge sections are arranged to cross such that a gap is formed between the transmit and receive bridge sections;

one or more regions of floating conductive material positioned in proximity to the transmit and receive body sections, each region comprising one or more connected members of conductive material extending into the gaps, a surface area of each of the one or more connected members being smaller than a surface area of a corresponding region of floating conductive material from which the connected member extends; and a sensing mechanism coupled to the receive electrodes and arranged to detect variations in the received signal at the receive electrodes.

16. A method for sensing a touch event, comprising:

transmitting a signal via one or more transmit electrodes;

forming an electrostatic coupling between the transmit electrodes and receive electrodes at a gap formed between the transmit electrodes and receive electrodes where the transmit electrodes cross one or more receive electrodes;

receiving the signal via the one or more receive electrodes; and detecting a change in the received signal when a conductor is introduced towards the gap; and increasing sensitivity to the change as a result of one or more regions of floating conductive material positioned in proximity to the transmit and receive electrodes, each region comprising one or more connected members of conductive material extending into the gaps, a surface area of each of the one or more connected members being smaller than a surface area of a corresponding region of floating conductive material from which the connected member extends.

17. The method of claim 16 comprising forming the electrostatic coupling in a single plane comprising the transmit electrodes and receive electrodes.

18. The method of claim 16 comprising forming the electrostatic coupling where the transmit and receive electrodes are in different planes.

19. The method of claim 16 performed in a touch screen device.

20. The method of claim 16 performed in a computing device.

* * * * *